Patented June 22, 1926.

1,589,512

UNITED STATES PATENT OFFICE.

ALBERT L. CLAPP, OF DANVERS, MASSACHUSETTS, ASSIGNOR TO THE FLINTKOTE COMPANY, OF BOSTON, MASSACHUSETTS, A CORPORATION OF MASSACHUSETTS.

CEMENT-ASPHALT COMPOSITION OF MATTER.

No Drawing. Application filed June 23, 1920. Serial No. 391,165.

This invention has for its object to provide a composition of matter which is light, hard, durable and substantially waterproof, when set, but which in a plastic condition is capable of being formed into sheets, of being molded, and of being applied with a trowel, so that it may be put to a great variety of uses.

The two principal components of the composition are asphalt, or its equivalent hydrocarbon or bitumen, and Portland cement, which are brought into admixture with sufficient water to react with the Portland cement.

For example, the composition may be prepared as follows: 300 parts by weight of asphalt (having a melting point of, say, 220°–240° F.) are heated until the asphalt is in a molten liquid condition, and 300 parts of dry Portland cement are thoroughly stirred into and incorporated with the asphalt, until the mass is substantially physically homogeneous. I now add to 600 parts of Portland cement a sufficient amount of water to form a paste, warm water being used, or else the mixture being heated, until it is at a temperature of about 140° F. Now, while the agitation of the first-mentioned mixture is continued, the second mixture is gradually added thereto, until the mass is practically homogeneous physically. The mixture is now ready for use. It may be rolled into a sheet by wet rolls spaced apart the desired distance, or it may be molded, or by means of a trowel or other implement it may be spread on any support. The asphalt in the mass appears in the form of discrete particles which coalesce during the cooling and setting of the mass. In about two hours the mass sets to a hard flinty state. In order to hasten the hardening or setting process I sometimes add to the mixture 25 parts of sodium silicate of a consistency of about 60° Baumé.

I find it desirable, in many cases, to employ in the mass thus described some fibrous or other inert material to increase the toughness of the mass and decrease its weight. As examples of materials which may be used, I may employ, for instance, asbestos fibers, "linters" or other cotton fiber, chemical or mechanical wood pulp, clay, fine sawdust or wood flour, or the like. For the manufacture of hard inflexible artificial shingles, to be used in lieu of those made of slate or for the manufacture of a plastic composition to be applied directly on a roof, I add to the mass and mix therewith, during the final agitation of the two principal mixtures first herein-described, 50 parts of asbestos fiber, so that, in the final product, the fibers will be uniformly distributed throughout the mass. An equal amount of cotton fiber, or of sawdust capable of being passed through an 80-mesh sieve, or of fine clay may be substituted for the asbestos, or a part may be substituted for a portion of the asbestos.

Of course, the exact proportions of the components of the composition as herein recited are capable of much variation in accordance with the desired characteristics of the final product. The fibrous materials act as a binder to preserve the coherence of the mass while plastic and when set, and at the same time they increase the bulk of the product and correspondingly decrease its weight by volume.

What I claim is:—

1. The herein described process of making a plastic composition capable of setting to a hard mass, which comprises mixing asphalt while in a liquid state with Portland cement, and then incorporating in the mass an aqueous paste of Portland cement.

2. The herein described process of making a plastic composition capable of setting to a hard mass, which comprises mixing asphalt while in a liquid state with Portland cement, and then incorporating in the mass both an aqueous paste of Portland cement and an inert material.

3. The herein described process of making a plastic composition capable of setting to a hard mass, which comprises mixing asphalt while in a liquid state with Portland cement, and then incorporating in the mass both an aqueous paste of Portland cement and an inert fibrous material.

4. The herein described process of making a plastic composition capable of setting to a hard mass, which comprises mixing asphalt while in a liquid state with Portland cement, and then incorporating in the mass an aqueous paste of Portland cement together with sodium silicate.

5. The herein described process of making a plastic composition capable of setting to a hard mass, which comprises mixing approximately 300 parts by weight of dry Portland cement and a substantially equal quantity of molten hard asphalt, and then incorporating in the mass about 600 pounds of Portland cement in the form of an aqueous paste.

6. The herein described process of making a plastic composition capable of setting to a hard mass, which comprises mixing approximately 300 parts by weight of dry Portland cement and a substantially equal quantity of molten hard asphalt, and then incorporating in the mass about 600 pounds of Portland cement in the form of an aqueous paste and a relatively small quantity of inert material.

7. A hard inflexible composition of matter comprising hard asphalt, Portland cement and an inert material, all in intimate admixture, said material having the characteristics of one prepared by intimately mixing dry Portland cement and molten hard asphalt and mixing therewith an aqueous Portland cement paste, together with an inert material, and then permitting the mass to set.

In testimony whereof I have affixed my signature.

ALBERT L. CLAPP.